M. VON ROHR.
MAGNIFYING GLASS.
APPLICATION FILED OCT. 1, 1912.
1,092,861.
Patented Apr. 14, 1914.
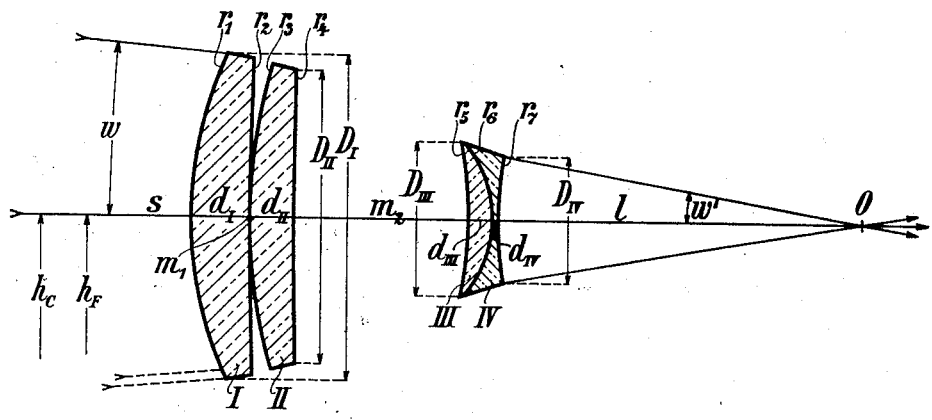

UNITED STATES PATENT OFFICE.

MORITZ von ROHR, OF JENA, GERMANY, ASSIGNOR TO THE FIRM OF CARL ZEISS, OF JENA, GERMANY.

MAGNIFYING-GLASS.

1,092,861.   Specification of Letters Patent.   Patented Apr. 14, 1914.

Application filed October 1, 1912. Serial No. 723,442.

*To all whom it may concern:*

Be it known that I, MORITZ VON ROHR, a citizen of the German Empire, residing at Jena, Germany, have invented a new and useful Magnifying-Glass, of which the following is a specification.

The invention consists in an improvement of the lens system of the magnifying glass of the Chevalier-Bücke type. In the forms of this lens system, which have so far become known, there is combined with a collective front combination sometimes formed of two members a dispersive rear combination. All these forms are not adequately corrected with regard to the errors of oblique pencils, in order to be available for vision with moving eye (direct vision).

For low-power magnifying glasses having exclusively spherical surfaces (of finite or infinite radius of curvature) in the front combination according to the present invention a correction of the astigmatism of oblique pencils and of the distortion sufficient for direct vision may be obtained, when the front combination is composed of two members. In order to make such a correction possible, according to this invention the pair of adjacent surfaces of the two members of the front combination is to be formed in such a manner that the air space bounded by it has the form of a dispersive glass meniscus. The two members may be single lenses, or one or both of them may consist each of two or more single lenses cemented together. As is well known, the crossing-point of the principal rays lies for such a correction about 25 mm. behind the rearmost lens-surface, viz. in the locus, into which the point of rotation of the eye is brought, when the instrument is in use. In order to obtain as low a total weight of the system as possible, the members of the front combination are formed as single lenses, a correction of the chromatic aberration being left to the rear combination only. In such a system crown glass is suitable for the said single lenses of the front combination, while the rear combination must comprise a crown glass and a flint glass lens. Such a disposition is specially suitable, when two magnifying glasses are to be united to form a binocular magnifying glass, which is fitted to the head of the observer, e. g. after the manner of a pair of spectacles.

In the annexed drawing a diagrammatic view is shown of a constructional example of the magnifying glass according to the invention. The form chosen for this example is the one, in which the front combination consists of two single crown glass lenses I and II and the rear combination of a crown glass lens III and a flint glass lens IV, which two latter are cemented together. The focal length of the front combination is 32.1 mm., that of the rear combination −21.1 mm. The focal length of the system is 128 mm., its power amounts therefore to approximately 8 dptr. Hence the power of magnification, the quotient from the "distinct visual distance" of 250 mm. and the focal length, is a twofold one. The distance $s$ of the object from the front vertex of lens I amounts to 227 mm., the distance $l$ from lens IV to the crossing-point $o$ of the principal rays (the point of rotation of the eye) to 25 mm. The angle of inclination $w$ of the principal rays on the side nearest the object amounts for the margin of lens I to 2.904°, the corresponding angle $w^1$ on the side nearest the eye to 10°. The distortion corresponding to the given principal rays is almost entirely removed, only quite unnoticeable aberrations from perfect orthoscopy remaining.

The following table contains besides the dimensions of the lenses and their distances apart as well as the kinds of glass particulars respecting the remainders of the astigmatism of oblique pencils and of the chromatic aberration. The astigmatism of oblique pencils is represented by the differences of the reciprocal values of the intersectional distances $s'_s$ and $s'_t$ on the side nearest the eye of the sagittal and meridional pencils, which appertain to the principal ray coinciding with the axis, to a principal ray of medium inclination and to the outermost principal ray inclosing with the axis the angle $w$ and the angle $w'$ respectively. The chromatic aberration is determined by the distances $h_C$ and $h_F$, at which the red and the blue component on the side nearest the object of the said outermost principal ray pass through the object-plane.

*Dimensions of the lenses in mm.*

Lens I:

$d_1 = 4.0$  $D_1 = 22.3$  $r_1 = 26.29$  $r_2 = 425.043$

Lens II:

$d_{II} = 3.0$  $D_{II} = 20.0$  $r_3 = 36.98$  $r_4 = 754.191$

Lens III:
$d_{III}=1.7$  $D_{III}=10.6$  $r_5=26.29$  $r_6=8.01$

Lens IV:
$d_{IV}=0.3$  $D_{IV}=8.7$  $r_6=8.01$  $r_7=26.29$

Distances in mm.

$m_1=0.0$  $m_2=12.0$

Kinds of glass.

Lenses I and II:  $n_D=1.5163$  $\nu=64.0$
Lens III:  $n_D=1.6130$  $\nu=56.4$
Lens IV:  $n_D=1.6130$  $\nu=37.0$ Correction of the astigmatism.

| $w=0$ | 2.064° | 2.904° |
|---|---|---|
| $\frac{1}{s'_a}=0$ | $-0.34$ dptr. | $-0.71$ dptr. |
| $\frac{1}{s'_b}=0$ | $-0.98$ " | $-1.94$ " |
| $\frac{1}{s'_a}-\frac{1}{s'_b}=0$ | $-0.64$ " | $-1.23$ " |

Correction of the chromatic aberration.

$w'=10°$  $h_C=22.65$ mm.  $h_F=22.624$ mm.

I claim:

In a magnifying glass of low power a lens system consisting of a collective front combination composed of two single lenses made of crown glass and having exclusively spherical surfaces and a dispersive rear combination, comprising a crown glass and a flint glass lens, the air space bounded by the pair of adjacent surfaces of the two lenses forming the front combination having the form of a dispersive glass meniscus.

MORITZ von ROHR.

Witnesses:
PAUL KRÜGER,
RICHARD HAKU.